US005788501A

United States Patent [19]

Hassall

[11] Patent Number: 5,788,501

[45] Date of Patent: Aug. 4, 1998

[54] PAINTINGS

[75] Inventor: John Graham Hassall, Bury, United Kingdom

[73] Assignee: JW Spear & Sons, PLC, United Kingdom

[21] Appl. No.: 698,898

[22] Filed: Aug. 16, 1996

[30] Foreign Application Priority Data

Aug. 18, 1995 [GB] United Kingdom ................... 9516962

[51] Int. Cl.[6] ................................ G09B 11/00

[52] U.S. Cl. ................................ 434/84; 434/81

[58] Field of Search ................................ 434/81, 84, 98

[56] References Cited

U.S. PATENT DOCUMENTS

| | | | |
|---|---|---|---|
| 416,171 | 12/1889 | Mahoney | 434/81 |
| 1,063,791 | 6/1913 | Hanington et al. | 434/81 |
| 2,744,349 | 5/1956 | Grossman | 434/84 |
| 3,284,927 | 11/1966 | Milne | 434/84 |
| 3,600,827 | 8/1971 | Fisher | 434/84 |
| 3,768,177 | 10/1973 | Thomas | 434/81 |
| 4,139,965 | 2/1979 | Curry et al. | 434/84 |
| 4,212,393 | 7/1980 | Lenkoff | 434/84 |
| 4,416,632 | 11/1983 | Berman | 434/84 |
| 4,696,400 | 9/1987 | Warman | 434/84 |
| 4,828,497 | 5/1989 | Kurgan | 434/81 |
| 4,836,381 | 6/1989 | Edwards et al. | 434/81 |
| 5,215,956 | 6/1993 | Kawashima | 434/84 |
| 5,228,858 | 7/1993 | Fromm | 434/84 |
| 5,234,344 | 8/1993 | Lenkoff | 434/84 |
| 5,292,255 | 3/1994 | Goldwasser | 434/84 |

FOREIGN PATENT DOCUMENTS

| | | | |
|---|---|---|---|
| 169916 | 10/1921 | United Kingdom | 434/84 |
| 716946 | 10/1954 | United Kingdom | 434/84 |
| 957670 | 8/1964 | United Kingdom | 434/84 |
| 1227027 | 3/1971 | United Kingdom | 434/84 |

*Primary Examiner*—Paul J. Hirsch

*Attorney, Agent, or Firm*—Longacre & White

[57] ABSTRACT

A support material for a painting comprises a substrate, e.g. of paper or card, having on regions thereof a removable masking material to provide pictorial content and to define non-masked regions of substrate which provide a surface for receiving and retaining paint, wherein the masking material is provided on the substrate in the form of a printed layer, applied for instance by screen printing. The preferred masking material is applied as a latex-based fluid and is removable from the substrate by an eraser after application of a water-based paint wash to the entire substrate surface. Optionally the subsequently unmasked regions can be painted to provide additional pictorial detail.

21 Claims, 2 Drawing Sheets

PAINTINGS

FIELD OF THE INVENTION

The present invention concerns paintings.

BACKGROUND OF THE INVENTION AND PRIOR ART

It is appreciated that considerable skill, patience and experience is required to create an original painting. Often, paintings produced by amateurs, especially children, are poor, with the exception of a small number of talented and gifted persons.

Various painting kits are available to assist amateur painters in producing an aesthetically pleasing painting. One example is the "painting by numbers" type kits. Such kits comprise a base sheet which has a surface divided into various areas, and each area printed with an identification number. The number designates the appropriate paint colour which should be applied to the area. However, such kits nevertheless require relatively careful application of paint and in particular that the paint must be retained within the boundary lines of each designated area. Generally, if the boundaries are not observed, an unacceptable painting results.

The present invention aims to alleviate at least some of the aforementioned problems. In particular, the invention seeks to address problems encountered by amateur painters who attempt to create a picture that involves blending of various colours.

SUMMARY OF THE INVENTION

In a first broad aspect, the present invention provides a support material for a painting, comprising a substrate having on regions thereof a removable masking material to provide pictorial content and to define non-masked regions of substrate which provide a surface for receiving and retaining paint, wherein the masking material is provided on the substrate in the form of a printed layer.

As used herein, the term "layer" referring to the form of the masking material on the substrate is to be construed broadly as meaning a stratum of the masking material having locally continuous and/or discontinuous regions, the size, shape, location and distribution of which give rise to the pictorial character which the masking material provides.

Preferred substrates are capable of retaining paint and releasing the appropriate masking material. Particularly preferred substrates are capable of absorbing paint rather than retaining it as a coating. This is preferred since such coatings could be susceptible to release upon removal of the masking material. In any event, it is required that the substrate is capable of retaining paint with greater strength than it can retain the masking material.

It is further preferred that the substrate is substantially form-sustaining to provide a reasonably firm base for application of paint. In this respect, preferred substrates include various forms of card and paper. Example suitable papers include water colour papers with (ROUGH),(NOT) and (HP) surfaces. Various textured and untextured paper are also applicable. In all cases the card/paper substrate may be tinted, if desired, with various colours.

Various masking materials may be employed in the present invention. It is desirable that the masking material be generally non-permeable to paint, to the extent that it provides an effective barrier to prevent or inhibit paint reaching the masked regions of substrate. In this respect, when the paint has dried in or on the masking materials, it may be readily removed along with the masking material.

Of course, the pictorial content of the masking material may take a host of forms. Also, the pictorial content need not be readily visible to the user before application of paint. Thus, the masking material may be selected to be generally transparent, or of a colour matching that of the substrate. Alternatively, it may be desirable to enhance visibility of the masking material by selecting it to be of a colour which contrasts with that of the substrate. Thus, within the scope of the invention is the use of masking material which is tinted by inclusion of one or more colour dyes to produce a masking material of any desired colour.

The masking material is selected to be of a nature which is capable of forming a releasable bond with the substrate. Any such bond should be of sufficient strength that it is not dislodged during the painting operation, namely when paint is applied to the masking material and substrate together. Nevertheless, the masking material should be releasable from the substrate after application of a paint, preferably simply by application of a pulling or friction force. In preferred embodiments, the masking material is selected to be of a nature (in terms of composition and thickness) such that it will disintegrate when a friction force of a predetermined strength is applied to it, e.g. by rubbing with the fingers or by use of an eraser or other suitable implement. In other embodiments, the masking material is capable of being peeled away from the substrate essentially as an integral film.

Particularly preferred masking materials are masking fluids as used by artists, particularly water colour artists, graphic designers, illustrators etc. Such masking fluids are typically used for various intermediate stages in producing a variety of types of artwork and are generally temporarily applied by the user to desired areas of a medium using a brush. Example masking fluids are available under various trade names such as COWGUM, COPYDEX®, Art Masking Fluid® (AMF®), watercolour art masking fluid, FRISK® masking film, including FRISK® masking film (LO.TACK). Preferred masking fluids contain a rubber latex component. In cases where the support material is to be used with water colour paint, the masking material should be non-water soluble.

Particularly preferred masking fluids comprise a natural rubber latex, especially a pre-vulcanised natural rubber latex. Natural rubber is generally preferred owing to its low adhesion to paper/card substrates. Pre-vulcanised lattices are also preferred as this results in the formation of a film of reasonable strength by the applied fluid.

In accordance with the invention the masking material is provided on the substrate in the form of a printed layer, i.e. it is applied to the substrate by a process comprising printing. In contrast with artists' conventional manner of application of masking fluid using a brush, by using a printing technique to apply the masking material to the substrate it is possible to achieve especially well defined and sharp edges and boundaries to the masked regions. This results in superior definition and resolution of the masked and unmasked regions of the substrate which give rise to the pictorial content. Finer pictorial details, e.g. fine lines, and more elaborate designs are also possible. Furthermore printing of the masking material also enables the creation of unusual aesthetic visual/pictorial/texture effects, e.g. pin-dot (stipple) shading, herring bone and weaving effects, cross-hatch patterns, graduations of tone. Printing of the masking material also enables the process of producing the support material to be applied reliably and economically on an industrial scale. Further details regarding the support material are explained below.

Especially preferred is to print the masking material X directly onto the substrate Many known printing techniques may be used, e.g. screen printing, litho printing, block printing. Screen printing is especially preferred. Conventional printing methods and apparatuses may be used, as are well known and used in the printing art, and as will be readily available to persons skilled in that art.

In some embodiments a masking fluid need not necessarily be applied by printing directly onto the substrate. For example, fluid may be applied by printing to a releasable base and dried or cured (or partially dried or cured) to form solidified elements having pictorial content, and the solidified elements subsequently released from the base and applied to the substrate. Thus, the masking fluid could be applied by printing to a surface of a transfer film and, when dried, transferred from the film to the substrate upon application of pressure to the reverse surface of the film.

In another broad aspect the present invention provides a painting kit, comprising one or more support materials, each support material comprising a substrate having on regions thereof a removable masking material to provide pictorial content and to define non-masked regions of substrate which provide a surface for receiving and retaining paint, wherein the masking material is provided on the substrate in the form of a printed layer, the support material(s) being in combination with one or more containers, each containing a paint medium, optionally with one or more applicators for enabling the paint media to be applied to the support material.

Preferably, the paint media comprise water colour paints or transparent or opaque paints, inks and dyes. It is preferred to employ colour washes of water colour paints, or any of the aforementioned media, with appropriate choice of substrate and masking material so that the paint is absorbed by and adheres to the substrate more strongly than to the masking material. It is also preferred that the paint is absorbed by the substrate so as to make it less susceptible to release during the procedure for removal of the masking material. For this reason, it is preferable to avoid paints which provide a brittle coating on the masking material or substrate. Otherwise, in such cases release of the masking material may also remove some of the paint, which would result in poor definition of pictorial content. It is a particular advantage of the present invention that the masking material is readily removable to expose previously masked regions of substrate and to provide a picture in which there is a clear contrast between the painted regions and unpainted regions of substrate.

In some preferred embodiments the painting kit also includes an eraser or other implement which is capable of removing the masking material upon application of frictional force by the user.

The kit may further include instructions for the user to follow in producing a painting using the kit, for example instructions relating to the removal of specified masked regionsand/or the application of particular colour paint washes, at different times over the course of producing the finished painting.

Optionally, the painting kit may include further masking material for releasable application to the substrate already carrying the primary masking material applied using a process comprising printing. Suitably the additional masking material provides additional pictorial content. In this respect, for example, the kit may include further masking material in the form of a film, pre-cut or formed to provide one or more elements of additional pictorial content. Alternatively or additionally, the kit may include further releasable masking material carried on a base and which may be subsequently transferred to the substrate. In such embodiments, a surface of a transfer film (preferably transparent) may be printed with latex elements of pictorial content which may be applied, as desired, to the substrate upon application of pressure to the reverse surface of the film. This may greatly improve versatility of the kit.

In yet another aspect the present invention provides a method of producing a painting, comprising applying one or more paint washes to a support material which comprises a substrate having on regions thereof a removable masking material to provide pictorial content and to define non-masked regions of substrate which provide a surface for receiving and retaining paint, wherein the masking material is provided on the substrate in the form of a printed layer, allowing the paint wash to dry, and removing masking material to expose unpainted substrate and to provide pictorial content defined by a contrast between painted and unpainted regions of substrate.

In the method of producing a painting, as discussed above preferably the colour wash involves use of water-based colour paints. Preferably, the colour wash is applied over substantially the full extent of the support material, including over exposed regions of substrate and over the masking material.

In the present method the paint wash is permitted to dry to the extent that it will not run into the previously masked regions, following removal of masking material. The method may also include the step of accelerating drying of the painting for example by warm or cool air dryers.

Preferred embodiments of the present method involve application(s) of various colour washes, and most preferably essentially the random application of colour washes so as to avoid formation of distinct bands of colour with clear boundaries between them. In other embodiments the provision of distinct bands of colour with clear boundaries between them may be desirable, depending upon the nature of the pictorial content of the masking material.

Some embodiments of the present method may also involve the subsequent application of paint wash to previously masked regions following release of masking material therefrom. This may be desirable for adding additional pictorial detail to the painting.

Embodiments of this aspect of the invention may also involve the step of applying further releasable masking material to the substrate, especially in the form(s) as defined above with respect to optional component(s) of a painting kit according to another aspect of the invention.

In a further aspect, the present invention provides a method of making a support material for a painting, the method comprising providing a substrate which is capable of receiving and retaining paint, and applying a removable masking material onto parts of the substrate so as to provide pictorial content and to define non-masked regions of substrate which provide a surface for receiving and retaining paint, wherein the masking material is applied to the substrate by a process comprising printing.

Preferred embodiments of this aspect of the invention involve use of masking material in liquid form, of an appropriate viscosity so that it is capable of being printed onto the substrate, and subsequently dried/cured to form a bond of an appropriate strength with the substrate. Example masking materials are masking fluids as used by artists and as discussed above. Various printing methods may be employed for applying the masking material to the substrate. For example, litho printing, block printing and screen printing may be appropriate.

Especially preferred embodiments involve screen printing such masking fluids. In this regard it may be desirable to adjust the consistency of commercially available masking fluids to ensure they are in a form suitable for screen printing. As an example, a suitable viscosity would be of the order of about 5000 cps—RVT 4.20. Also, in the case of screen printing, the printing screen may be provided with apertures of a host of alternative forms corresponding to the desired pictorial content to be provided on the substrate.

DETAILED DESCRIPTION OF THE INVENTION AND PREFERRED EMBODIMENTS

Figure 1:
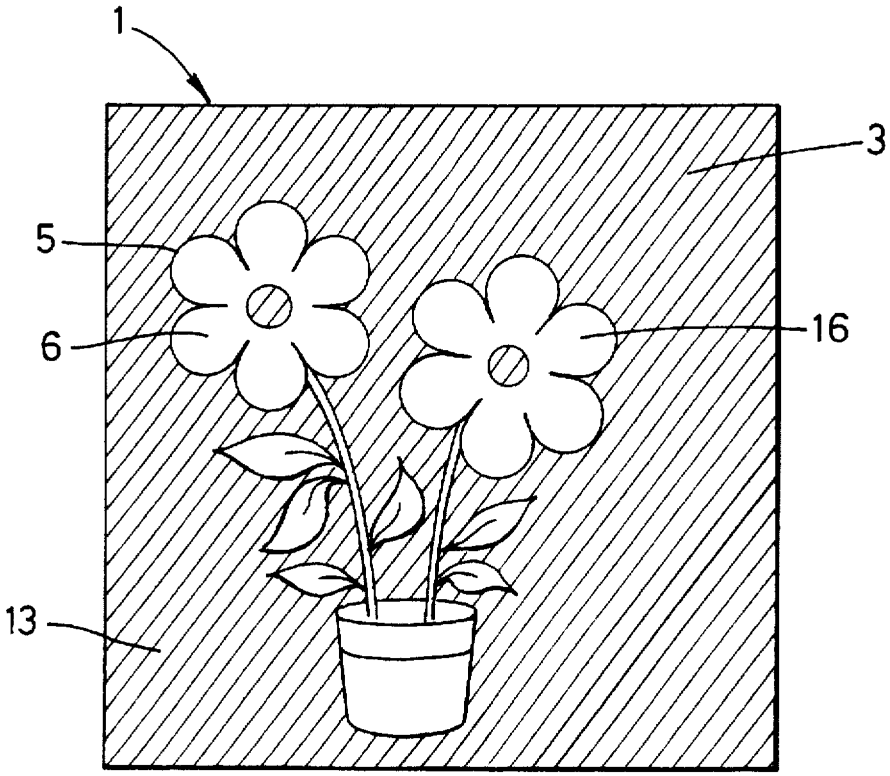
FIGS. 1,2,3 and 4 illustrate an example of support material in various stages of use.

Embodiments of the present invention will now be described in detail, by way of example, with reference to the accompanying drawings, in which:

Referring firstly to FIG. 1, this illustrates a support material 1 comprising a substrate 6 of card which carries masking material 3. In the illustrated embodiment the masking material 3 provides pictorial content in the form of a potted plant. Of course, the pictorial content could take a host of alternative forms. Suitably a kit will be provided containing various selected support materials 1 (having different pictorial contents) together with a selection of paints.

The masking material 3 is an art masking fluid, comprising a pre-vulcanised natural rubber latex, such as that available under the trade mark ART MASKING FLUID (AMF). The viscosity of the commercially available fluid was adjusted by addition of a thickening agent, for example polymeric thickeners, such as alkali-soluble acrylic polymer in the form of an aqueous emulsion, to about 5000 cps—RVT 4/20. The masking material 3 has been screen printed onto the substrate 6 to provide masked regions 13 and unmasked regions 16. The masked and unmasked regions 13, 16 respectively are arranged so that either provides pictorial content, as defined by apertures in the printing screen. As illustrated in the drawings, use of screen printed fluid results in sharp boundaries 5 between the masked regions 13 and unmasked regions 16.

Figure 2:
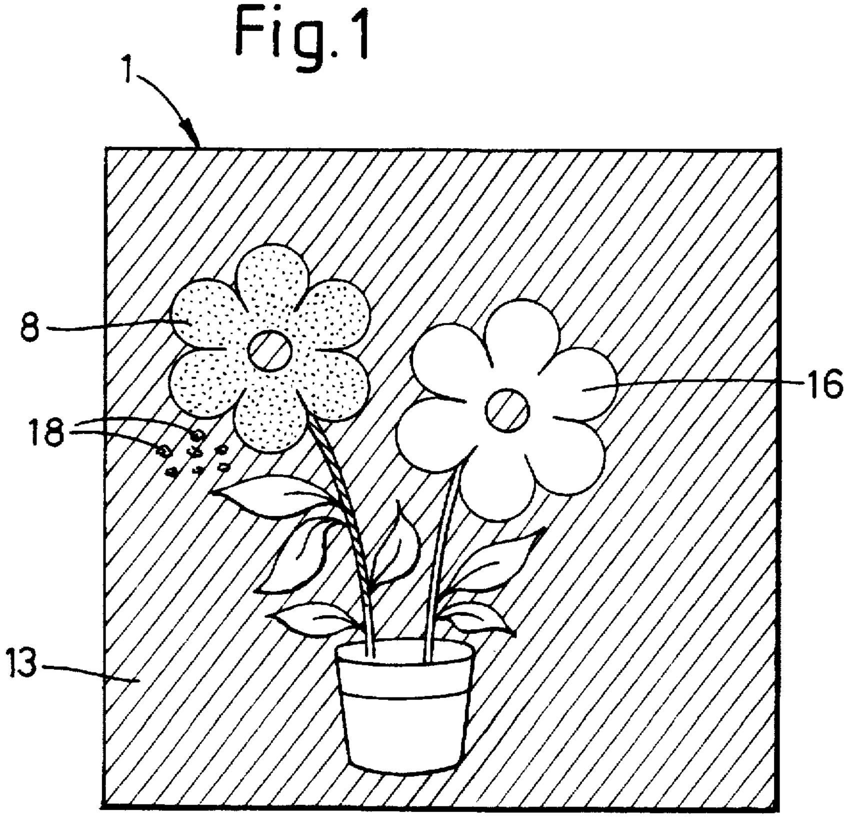

As illustrated in FIG. 2, to use the support material 1, paint 8 is applied (possibly randomly) over the masked and unmasked regions 13, 16 respectively. Typically, various colour washes of selected water based fluids are applied in a random fashion over the entire surface of the support material 1. Excess paint, illustrated as 18, is retained on masking material 3.

Figure 3:
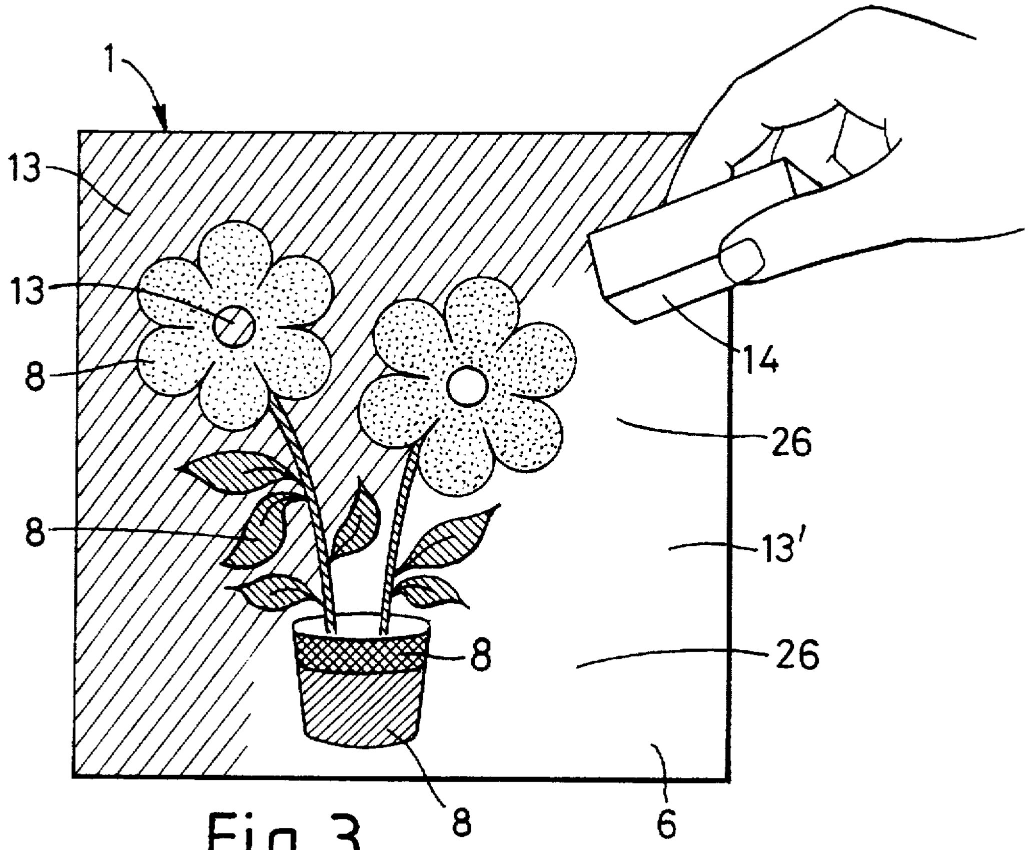

FIG. 3 illustrates what may be either the final or penultimate stage in the use of the support material 1. Once the colour washes have been permitted to dry, the masking material 3 is removed from the substrate 6. This may be effected by use of an eraser 14. Thus, the masking material 3 is rubbed with the eraser 14 and this effectively disintegrates the masking material 3 to release it from the substrate 6. This exposes regions 13 of unpainted substrate 26. The masking material 3 is readily removable to provide sharp definition and contrast to the unpainted substrate 26 and painted regions 16 and the end result is an aesthetically pleasing painting, achievable even by random application of paint.

The present invention thus allows, in particular, a complete novice to tackle and achieve the difficult "loose" application of colour to water-colour paper, for example, known as a "wash", whilst maintaining the broad outline of the subject matter. This method allows for an aesthetically pleasing painting, previously very difficult for a novice to achieve in other water-colour painting kits, (e.g. water-colour painting with ghostlines), whereby the painted form/outline of the subject matter is often lost.

Figure 4:
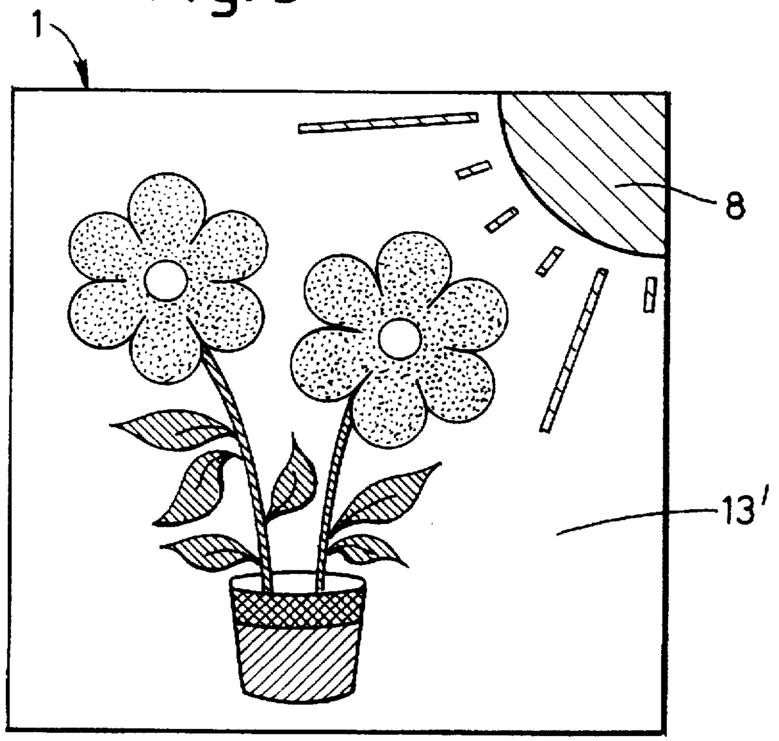

FIG. 4 illustrates a further, optional step. This involves the subsequent application of paint B to a previously masked region 13'. In this way the user may add additional detail to the painting, as desired.

In the illustrated embodiment the masked region of the support material acts as background to a painted design which is applied to the unmasked region. Of course, this could be done in reverse, with the masked regions providing a design as a contrast to a painted background.

It will be appreciated that use of masking material in this way enables an amateur painter to achieve an aesthetically pleasing result, even by random or careless application of colour wash. The user has free reign to apply any selected colours in any selected regions of the support material, resulting in great versatility in producing a painting from a given starting support material.

Also, the depth or strength of colour employed is unimportant and again, this allows the user to exercise their own creativity.

Various modifications may be made to the illustrated embodiment. For example, of course the pictorial content defined by the masking material may take any form, abstract or otherwise. Also, the substrate may be coloured or optionally preprinted with some additional pictorial content or surface decoration e.g. glitter. As one example of this, the substrate may be provided with one or more regions or features comprising half-tone printing, e.g. grey half-tone values or full colour (of any colour) half-tone printing, which regions or features may or may not also be provided with masking material. Such half-tone printing can be used to further enhance or to provide extra tonal contrasts to add to the pictorial content of the finished painting. In addition, rather than a printed masking material which is subsequently removed with an eraser, the masking material may dry or cure to form a film which may be removed by peeling it from the substrate.

Versatility may also be improved by providing the user with the materials for masking desired regions of a substrate. Thus, for example, a kit may include substrate paper/card and masking material preprinted thereon to provide pictorial content, optionally with a selection of paints and/or further printed masking material for transfer to the substrate. The user may then, if he/she wishes, apply additional masking material to desired locations on the substrate and subsequently paint over the additional masked and unmasked regions as before. In this regard, the masking material may comprise latex elements printed on a transparent film and which are capable of being readily transferred from the film to the paper/card substrate. This may be by lying the film over the substrate, with the latex abutting the substrate, and rubbing the exposed surface of the film to press the latex onto the substrate.

I claim:

1. A support material for a painting, comprising a substrate having on regions thereof a removable masking material providing pictorial content and defining non-masked regions of substrate which provide a surface for receiving and retaining paint, wherein the masking material is provided on the substrate in the form of a printed layer.

2. A support material according to claim 1, wherein the substrate is capable of retaining paint with greater strength than it retains the masking material.

3. A support material according to claim 1, wherein the substrate is substantially form-sustaining providing a firm base for application of paint.

4. A support material according to claim 1, wherein the masking material is substantially non-permeable to the paint to the extent that it provides an effective barrier to inhibit paint reaching the masked regions of the substrate.

5. A support material according to claim 1, wherein the masking material forms a releasable bond with the substrate, the bonding strength being sufficient to prevent the masking material being dislodged when paint is being applied to the masking material and substrate together but to be releasable from the substrate after the paint has been applied.

6. A support material according to claim 5, wherein the masking material has a composition and thickness which permits it to disintegrate when a friction force of a predetermined strength is applied to it.

7. A support material according to claim 5, wherein the masking material is capable of being peeled away from the substrate substantially as an integral film.

8. A support material according to claim 1, wherein the masking material is formed from a masking fluid containing a rubber latex component.

9. A painting kit comprising at least one support material which comprises a substrate having on regions thereof a removable masking material providing pictorial content and defining non-masked regions of substrate which provide a surface for receiving and retaining paint, wherein the masking material is provided on the substrate in the form of a printed layer, the support material being in combination with at least one container which contains a paint medium.

10. A painting kit according to claim 9, further including a friction implement which is capable of removing the masking material upon application of a friction force by a user.

11. A painting kit according to claim 9, further including further masking material for releasable application to the substrate.

12. A painting kit according to claim 9, further including releasable masking material carried on a base, for subsequent transfer to the substrate.

13. A painting kit according to claim 9, further comprising at least one applicator for enabling the paint medium to be applied to the support material.

14. A method of producing a painting comprising applying at least one paint medium to a support material which comprises a substrate having on regions thereof a removable masking material to provide pictorial content and to define non-masked regions of substrate which provide a surface for receiving and retaining paint, wherein the masking material is provided on the substrate in the form of a printed layer, allowing the at least one paint medium to dry, and removing the masking material to expose unpainted substrate and to provide pictorial content defined by a contrast between painted and unpainted regions of substrate.

15. A method according to claim 14, wherein the at least one paint medium comprises water-based colour paints.

16. A method according to claim 14, wherein the at least one paint medium is permitted to dry to the extent that it will not run into the previously masked regions following removal of the masking material.

17. A method according to claim 14, further including subsequent application of paint medium to previously masked regions following removal of masking material therefrom.

18. A method according to claim 14, further including the step of applying further releasable masking material to the substrate.

19. A method of making a support material for a painting, the method comprising providing a substrate which is capable of receiving and retaining paint, and applying removable masking material onto parts of the substrate thereby providing pictorial content and defining non-masked regions of substrate which provide a surface for receiving and retaining paint, characterised in that the masking material is applied to the substrate by a process comprising printing.

20. A method according to claim 19, wherein the masking material is in the form of a liquid and is applied directly to the substrate by printing.

21. A method according to claim 19, further including providing film having cut-out regions to define pictorial content and releasably adhering the film to the substrate.

* * * * *